United States Patent
Cuvillier et al.

(10) Patent No.: US 12,176,793 B2
(45) Date of Patent: Dec. 24, 2024

(54) METHOD FOR REGULATING THE ACCELERATION OF A TURBOMACHINE

(71) Applicant: SAFRAN AIRCRAFT ENGINES, Paris (FR)

(72) Inventors: Romain Guillaume Cuvillier, Moissy-Cramayel (FR); Pierre Cabrera, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 2 days.

(21) Appl. No.: 17/596,172

(22) PCT Filed: Apr. 27, 2020

(86) PCT No.: PCT/FR2020/050716
§ 371 (c)(1),
(2) Date: Dec. 3, 2021

(87) PCT Pub. No.: WO2020/245516
PCT Pub. Date: Dec. 10, 2020

(65) Prior Publication Data
US 2022/0231577 A1   Jul. 21, 2022

(30) Foreign Application Priority Data
Jun. 6, 2019 (FR) ........................ 1906001

(51) Int. Cl.
*H02K 7/18* (2006.01)
*F02C 9/00* (2006.01)

(52) U.S. Cl.
CPC ............ *H02K 7/1823* (2013.01); *F02C 9/00* (2013.01); *F05D 2220/323* (2013.01); *F05D 2220/76* (2013.01); *F05D 2270/024* (2013.01)

(58) Field of Classification Search
CPC . H02K 7/1823; F02C 9/00; F02C 7/26; F02C 7/266; F02C 3/04; F02C 7/00;
(Continued)

(56) References Cited

U.S. PATENT DOCUMENTS

2005/0056021 A1* 3/2005 Belokon .................. F02C 9/32
60/734
2017/0226934 A1 8/2017 Robic et al.

FOREIGN PATENT DOCUMENTS

FR   2914697 A1   10/2008
FR   3066444 A1   11/2018
(Continued)

OTHER PUBLICATIONS

French Search Report issued in French Application FR1906001 on Feb. 21, 2020 (2 pages).
(Continued)

*Primary Examiner* — Joseph Ortega
(74) *Attorney, Agent, or Firm* — Bookoff McAndrews, PLLC

(57) ABSTRACT

The invention relates to a method for regulating an acceleration of a turbomachine, the turbomachine comprising a combustion chamber, a high-pressure turbine located downstream of the combustion chamber and which drives a high-pressure shaft in rotation, and a low-pressure turbine located downstream of the high-pressure turbine and which drives a low-pressure shaft in rotation, characterized in that the method comprises the following steps: injecting mechanical power onto the high-pressure shaft until a speed of the high-pressure shaft attains a target value, then extracting mechanical power from the high-pressure shaft so as to maintain the speed at the target value.

3 Claims, 2 Drawing Sheets

(58) Field of Classification Search
CPC ........... F05D 2220/323; F05D 2220/76; F05D 2270/024; F05D 2270/02; F02K 3/06; F02K 5/00; B64D 2027/026; F01D 15/10
See application file for complete search history.

(56) References Cited

FOREIGN PATENT DOCUMENTS

| | | | |
|---|---|---|---|
| JP | 2007505261 | A | 3/2007 |
| JP | 2008082335 | A | 4/2008 |
| JP | 2017048784 | A | 3/2017 |
| WO | 2005028832 | A1 | 3/2005 |

OTHER PUBLICATIONS

International Search Report issued in International Application PCT/FR2020/050716 with Written Opinion on Sep. 9, 2020 (3 pages).
Notice of Reasons for Refusal issued in corresponding application No. 2021-572075, mailed Jan. 9, 2024.

\* cited by examiner

[Fig. 1]
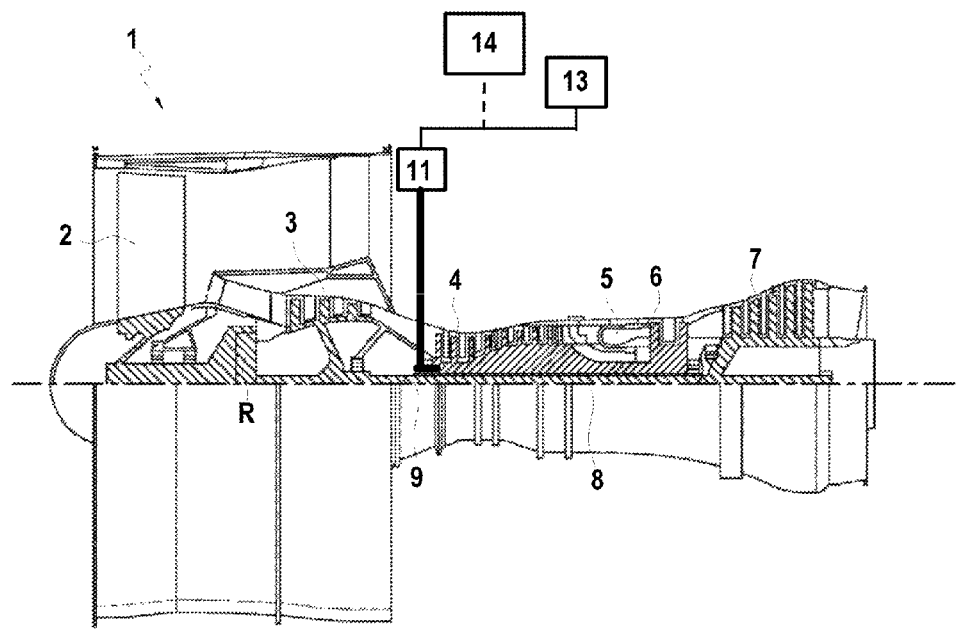
[Fig. 2]
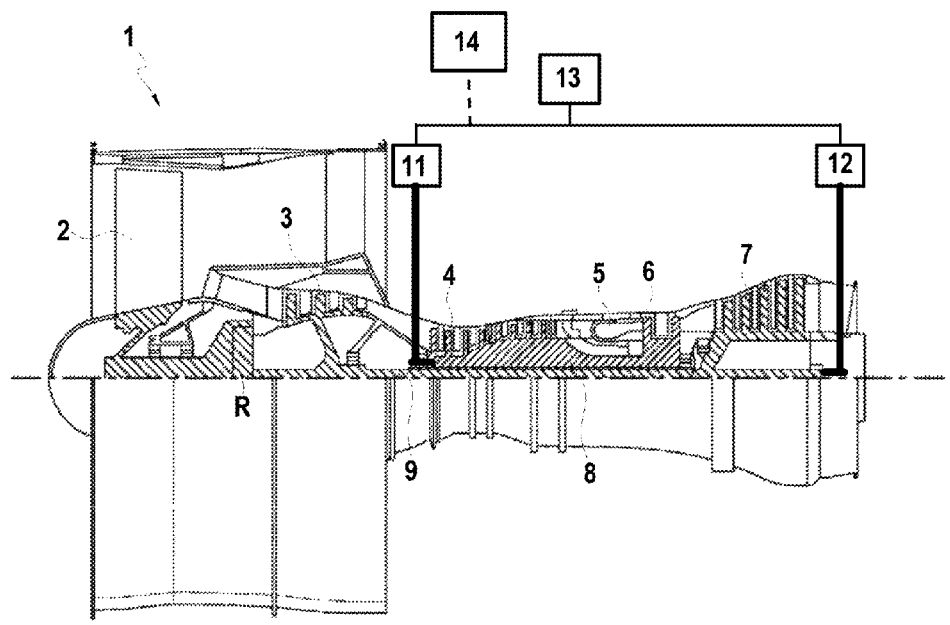

[Fig. 3]
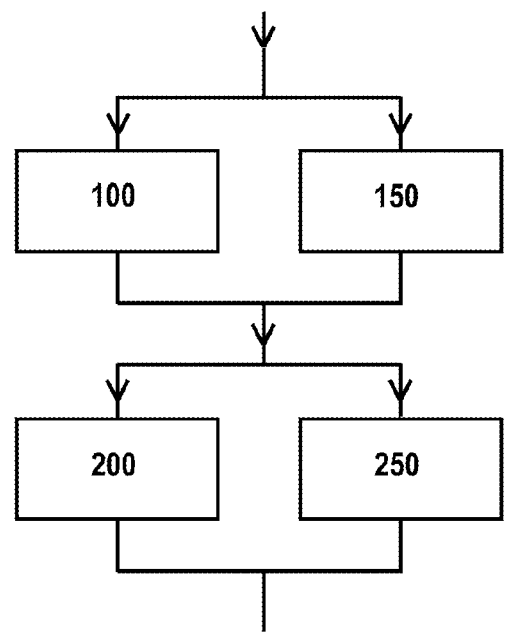

METHOD FOR REGULATING THE ACCELERATION OF A TURBOMACHINE

CROSS-REFERENCE TO RELATED APPLICATION(S)

This patent application is the U.S. National Stage entry under 35 U.S.C. § 371 of International Patent Application No. PCT/FR2020/050716, filed on Apr. 27, 2020, which claims the benefit of priority to French Patent Application No. 1096001, filed on Jun. 6, 2019.

TECHNICAL FIELD

The present invention relates to the general field of turbomachines for aircraft.

PRIOR ART

Generally, a turbomachine for aircraft comprises a high-pressure shaft (HP shaft) driven in rotation by a high-pressure turbine (HP) turbine, and a low-pressure shaft (LP shaft) driven in rotation by a low-pressure (LP) turbine, the low-pressure shaft driving in rotation a fan of the turbomachine.

During an acceleration phase of the turbomachine, a lag can occur between the high-pressure (HP) shaft and the low-pressure (LP) shaft of the turbomachine in attaining the target rotation speed. Indeed, the applicant has noted that the low-pressure shaft tends to accelerate less quickly than the high-pressure shaft, and thus the low-pressure shaft reaches its target rotation speed later than the high-pressure shaft. The applicant has noticed that the delay in the acceleration of the low-pressure shaft increases strongly when a reduction gear is placed between the low-pressure shaft and the fan.

The delay in the acceleration of the low-pressure shaft causes a delay in the acceleration of the fan, thus increasing the period between the acceleration command and the moment when the target thrust is obtained.

DISCLOSURE OF THE INVENTION

The present invention therefore has as its goal to supply a solution responding the problem previously described.

According to a first aspect, the invention relates to a method for regulating an acceleration of a turbomachine, the turbomachine comprising a combustion chamber, a high-pressure turbine located downstream of the combustion chamber and which drives a high-pressure shaft in rotation, and a low-pressure turbine located downstream of the high-pressure turbine and which drives a low-pressure shaft in rotation, characterized in that the method comprises the following steps:
Injecting mechanical power onto the high-pressure shaft until a speed of the high-pressure shaft attains a target value, then
Extracting mechanical power from the high-pressure shaft so as to maintain the speed at the target value.

A regulation method of this type allows reducing the delay between the acceleration of the high-pressure shaft and the low-pressure shaft. At the beginning of the acceleration phase, power is injected onto the high-pressure shaft to help it to accelerate, then the acceleration of the high-pressure shaft is stopped so as to allow a strong acceleration of the low-pressure shaft: the low-pressure shaft then attains its target speed more rapidly than in the prior art. More generally, the duration of acceleration of the high-pressure shaft and of the low-pressure shaft are both shorter than in the prior art.

According to one possible feature, the step of extracting mechanical power from the high-pressure shaft is accomplished by means of a first electrical machine in the electrical generator mode.

According to one possible feature, the step of injecting mechanical power onto the high-pressure shaft is accomplished by the first electrical machine in the electrical motor mode.

According to one possible feature, the method comprises the following step, accomplished in parallel with the step of extracting mechanical power from the high-pressure shaft: injecting mechanical power onto the low-pressure shaft.

According to one possible feature, the method comprises the followings step, accomplished in parallel with the step of injecting mechanical power onto the high-pressure shaft: extracting mechanical power from the low-pressure shaft.

According to one possible feature, the step of injecting mechanical power onto the low-pressure shaft is accomplished by a second electrical machine in the electric motor mode, and the step of extracting mechanical power from the low-pressure shaft is accomplished by said second electrical machine in the electrical generator mode.

According to one possible feature, the turbomachine comprises a high-pressure compressor which is located upstream of the combustion chamber and which is driven in rotation by the high-pressure shaft, the method comprising the following step: monitoring the high-pressure compressor by determining a surging parameter of the high-pressure compressor, the step of injecting mechanical power onto the high-pressure shaft being accomplished if the surging parameter of the high-pressure compressor attains a threshold value.

According to a second aspect, the invention relates to a turbomachine for aircraft comprising:
a high-pressure turbine which is located downstream of a combustion chamber and which is connected to a high-pressure shaft;
a low-pressure turbine which is located downstream of the high-pressure turbine and which is connected to a low-pressure shaft;
a device for injecting mechanical power onto the high-pressure shaft;
a device for extracting mechanical power from the high-pressure shaft;
a control system which is connected to the injection device and to the extraction device, the control system being configured to implement the method for regulating the acceleration of the turbomachine according to any one of the preceding features.

According to one possible feature, the injection device is a first electrical machine configured to operate in the electric motor mode, and the extraction device is the first electrical machine configured to operate in the electrical generator mode.

According to one possible feature, the turbomachine comprises a second electrical machine which is connected to the low-pressure shaft and which is configured to operate in the electric motor mode and to inject mechanical power onto the low-pressure shaft.

According to one possible feature, the second electrical machine is configured to operate in the electrical generator mode and to extract mechanical power from the low-pressure shaft.

BRIEF DESCRIPTION OF THE DRAWINGS

Other features and advantages of the present invention will be revealed by the description given below, with reference to the appended drawings which illustrate one embodiment of it devoid of any limiting character.

FIG. 1 shows schematically a turbomachine for aircraft according to a first embodiment.

FIG. 2 shows schematically a turbomachine for aircraft according to a second embodiment.

FIG. 3 shows schematically the steps of a method for regulating the acceleration of a turbomachine.

DESCRIPTION OF THE EMBODIMENTS

FIG. 1 illustrates schematically an aircraft two spool, double flow turbomachine 1 comprising, from upstream to downstream in the flow direction of the air flow, a fan 2, a low-pressure (LP) compressor 3, a high-pressure (HP) compressor 4, a combustion chamber 5, a high-pressure (HP) turbine 6 and a low-pressure (LP) turbine 7.

The high-pressure turbine 6 is connected to the high-pressure compressor 4 by a high-pressure shaft 8, and the low-pressure turbine 7 is connected to the low-pressure turbine 3 and to the fan 2 by a low-pressure shaft 9.

In addition, as illustrated in FIGS. 1 and 2, the turbomachine 1 can comprise a reduction gear R which connects the fan 2 to the low-pressure shaft 9, the reduction gear R thus allowing decoupling the rotation speeds of the fan 2 and of the low-pressure turbine 9. However, the invention can also be used for a turbomachine 1 in which the fan 2 is directly connected to the low-pressure shaft 3, and is thus directly coupled to the low-pressure turbine 7. The invention is however more advantageous when the turbomachine 1 comprises a reduction gear R, the Applicant having noted that the inertia of the low-pressure spool is increased when the turbomachine 1 comprises a reduction gear R.

The turbomachine 1 comprises a first electrical machine 11 which is connected to the high-pressure shaft 8. The first electrical machine 11 is a reversible machine which is configured to, on the one hand, operate in the electrical generator mode and thus extract mechanical power from the high-pressure shaft 8, and on the other hand to operate in the electric motor mode and thus inject mechanical power onto the high-pressure shaft 8. According to another possible variant, the first electrical machine 11 is an electrical generator and is not reversible, said first electrical machine 11 not being able to operate as an electric motor in this variant.

As illustrated in FIG. 2, the turbomachine 1 can comprise a second electrical machine 12 which is connected to the low-pressure shaft 9. The second electrical machine 12 can be an electric motor which is configured to inject mechanical power onto the low-pressure shaft 9. The second electrical machine can be a reversible machine which is configured, on the one hand, to operate in the electrical generator mode and thus extract mechanical power from the low-pressure shaft 9, and on the other hand to operate in the electric motor mode and thus inject mechanical power onto the low-pressure shaft 9. According to another possible variant, the second electrical machine 12 is an electric motor and is not reversible, said second electrical machine 12 not being able to operate as an electrical generator in this variant.

The turbomachine 1 comprises a control system 13 which is connected to the first electrical machine 11 and to the second electrical machine 12. The control system 13 is configured to implement a method for regulating the acceleration of the turbomachine 1 in order to reduce the time taken by said turbomachine 1 to accelerate. In other words, the method implemented by the control system 13 allows reducing the delay between the acceleration command and the moment when the turbomachine 1 generates the target thrust. The method allows in particular reducing the delay in attaining takeoff thrust.

The method of regulating the acceleration of the turbomachine 1 implemented by the control system 13 comprises the following steps:

Injecting 100 mechanical power onto the high-pressure shaft 8 until a speed of the high-pressure shaft 8 reaches a target value, then Extracting 200 mechanical power from the high-pressure shaft 8 so as to maintain the speed at the target value by the same electrical machine 11.

The first electrical machine 11, operating in the electric motor mode, is thus commanded by the control system 13 to accelerate the high-pressure shaft 8 until it attains the target speed. Then the first electrical machine 11, operating in the electrical generator mode, is commanded by the control system 13 to extract mechanical power from the high-pressure shaft 8 when the high-pressure shaft 8 has attained the target speed.

The Applicant has taken notice of the fact that curbing the rotation speed of the high-pressure shaft 8 when the high-pressure spool of the turbomachine 1 has attained the target speed (by extracting mechanical power from the high-pressure shaft) allows accelerating the speed increase of the low-pressure spool of the turbomachine 1 and thus allows obtaining the target thrust more rapidly. In fact, the rotation speed of the high-pressure shaft 6 being curbed, additional energy is transmitted to the low-pressure shaft 7.

The control system 13 can regulate the acceleration of the turbomachine by using the corrected speed of the high-pressure shaft 8. The corrected speed of the high-pressure shaft 8 corresponds to the temperature-weighted rotation speed of the high-pressure shaft 8.

According to one advantageous variant allowing further reducing the duration of acceleration of the low-pressure spool of the turbomachine 1, when said high-pressure shaft 8 has attained the target speed, the mechanical power extracted from the high-pressure 8 is injected onto the low-pressure shaft 9 (step 250).

This variant can be implemented by the control system 13 which controls the first electrical machine 11 so that it operates in the electrical generator mode and supplies the second electrical machine 12, which operates in the electric motor mode, with electricity. A transformer can be located between the first electrical machine 11 and the second electrical machine 12 in order to adapt the electrical current.

According to one possible solution, the first electrical machine 11 is supplied with electricity by a battery 14 when it operates in the electric motor mode.

According to another possible solution, the first electrical machine 11 is supplied with electricity when it operates in the electric motor mode by the second electrical machine 12 which operates in the electrical generator mode 12, the second electrical machine 12 generating electricity by extracting mechanical power from the low-pressure shaft 9 (step 150). The Applicant has in fact taken notice of the fact that it is advantageous to first ensure rapid acceleration of the high-pressure spool, then of the low-pressure spool. A transformer can be positioned between the first electrical machine 11 and the second electrical machine 12 in order to adapt the electrical current.

According to one possible variant allowing reducing the risk of surging of the high-pressure compressor 4, the control system 13 is configured to implement a step of monitoring the high-pressure compressor 4. This step of monitoring the high-pressure compressor 4 is accomplished by determining a surging parameter of the high-pressure compressor 4 and by injecting mechanical power onto the high-pressure shaft 8 when said pumping parameter of the high-pressure compressor 4 attains a threshold value. Pumping is the phenomenon by which a reversal of the direction of the flow of air occurs due to too high a pressure difference between the inlet of the compressor and the outlet of the compressor.

The surging parameter of the high-pressure compressor 4 can be determined based on the pressure ratio of said high-pressure compressor 4, i.e. the ratio between the outlet pressure of the high-pressure compressor 4 and the inlet pressure of said high-pressure compressor 4, and on the flow rate of said high-pressure compressor 4. The turbomachine 1 can therefore comprise a first pressure sensor which is configured to measure the pressure at the inlet of the high-pressure compressor 4, as well as a second pressure sensor which is configured to measure the outlet pressure of the high-pressure compressor 4, the first pressure sensor and the second pressure sensor being connected to the control system 13. The turbomachine can also comprise a flow rate meter which is configured to measure the flow rate of air in the high-pressure compressor 4, said flow rate meter being connected to the control system 13.

Thus, the fact that the control system 13 is configured to monitor the evolution of the surge parameter and control the injection of mechanical power into the high-pressure compressor 4 when the value of the parameter indicates that a surge phenomenon is likely to occur, allows reducing the risk of surging.

This step of monitoring the high-pressure compressor 4 is accomplished throughout the method and simultaneously with the other steps. When mechanical power is injected into the high-pressure compressor 4 because the surge parameter of said high-pressure compressor 4 has attained the threshold value, the curbing of the speed of the high-pressure shaft 8 is temporarily stopped until the surge parameter again passes below the threshold value.

The invention claimed is:

1. A method for regulating an acceleration of a turbomachine, the turbomachine comprising a combustion chamber, a high-pressure turbine located downstream of the combustion chamber and which drives a high-pressure shaft in rotation, and a low-pressure turbine located downstream of the high-pressure turbine and which drives a low-pressure shaft in rotation, wherein the method comprises:
    injecting mechanical power onto the high-pressure shaft until a speed of the high-pressure shaft attains a target value via a first electrical machine, wherein the first electrical machine is an electric motor mode to inject mechanical power onto the high-pressure shaft;
    extracting mechanical power from the high-pressure shaft so as to maintain the speed at the target value via the first electrical machine, wherein the first electrical machine switches to an electrical generator mode to extract mechanical power from the high-pressure shaft;
    injecting mechanical power onto the low-pressure shaft via a second electrical machine, in parallel with extracting mechanical power from the high-pressure shaft via the first electrical machine, wherein the second electrical machine is in the electric motor mode to inject mechanical power onto the low-pressure shaft; and
    extracting mechanical power from the low-pressure shaft via the second electrical machine, in parallel with injecting mechanical power onto the high-pressure shaft via the first electrical machine, wherein the second electrical machine switches to the electrical generator mode to extract mechanical power from the low-pressure shaft.

2. The method according to claim 1, wherein the turbomachine comprises a high-pressure compressor which is located upstream of the combustion chamber and which is driven in rotation by the high-pressure shaft, the method comprising:
    monitoring the high-pressure compressor by determining a surging parameter of the high-pressure compressor, wherein injecting mechanical power onto the high-pressure shaft is accomplished if the surging parameter of the high-pressure compressor attains a threshold value.

3. A turbomachine for aircraft comprising:
    a high-pressure turbine which is located downstream of a combustion chamber and which is connected to a high-pressure shaft;
    a low-pressure turbine which is located downstream of the high-pressure turbine and which is connected to a low-pressure shaft;
    a device for injecting mechanical power onto the high-pressure shaft;
    a device for extracting mechanical power from the high-pressure shaft;
    a control system which is connected to the injection device and to the extracting device, the control system being configured to implement the method for regulating the acceleration of the turbomachine according to claim 1,
    the device for injection being the first electrical machine configured to operate in the electric motor mode, and the device for extracting is the first electrical machine configured to operate in the electrical generator mode,
    the turbomachine also comprising the second electrical machine which is connected to the low-pressure shaft and which is configured to operate in the electric motor mode and to inject mechanical power onto the low-pressure shaft and is configured to operate in the electrical generator mode to extract mechanical power from the low-pressure shaft.

* * * * *